J. Dyson.
Carding Engine.
N° 26,347.  Patented Dec. 6, 1859.
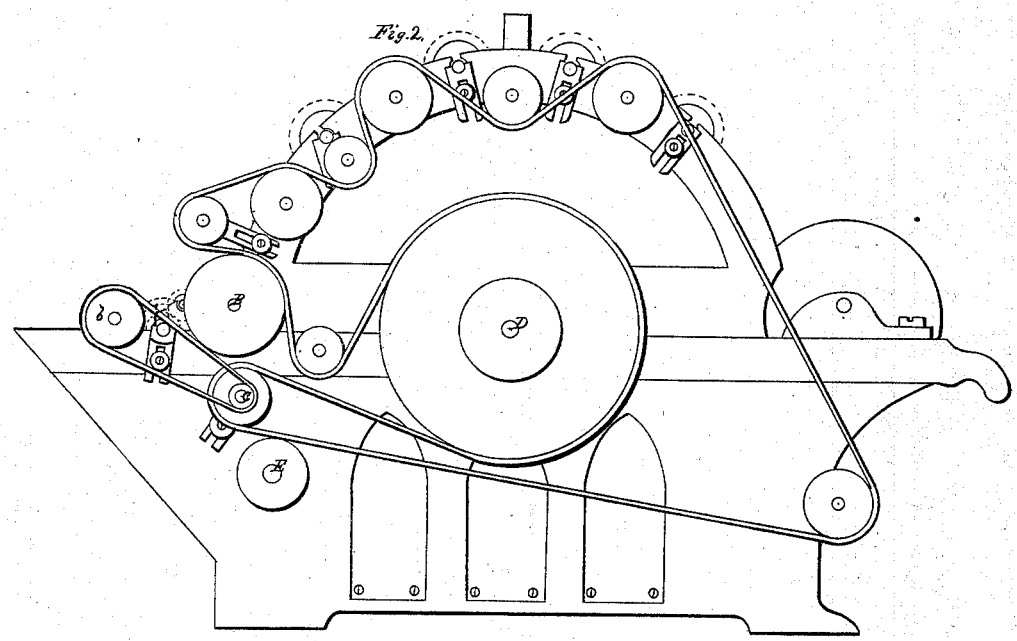
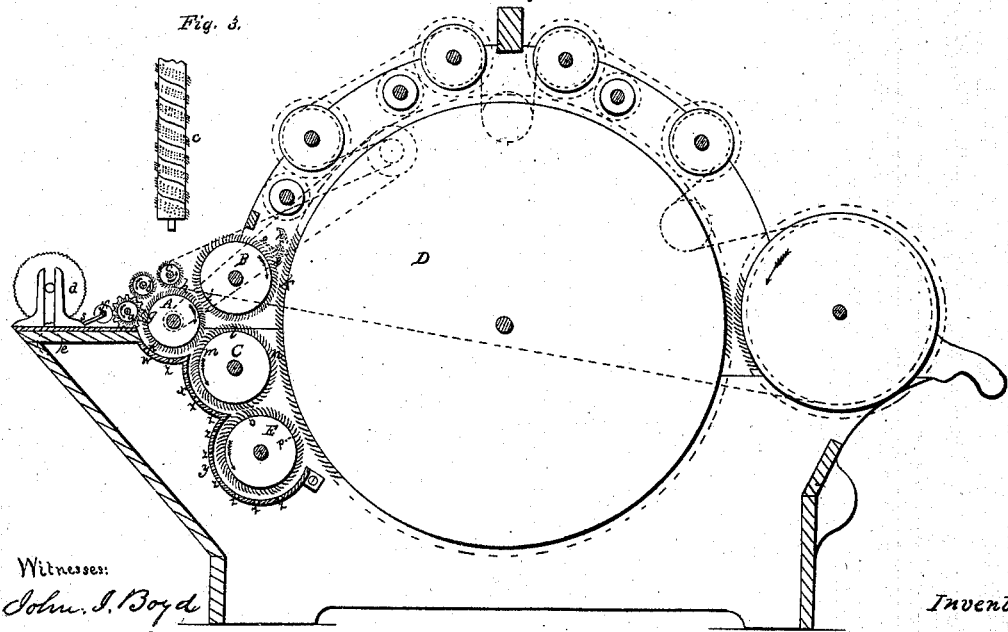
Witnesses:
John J. Boyd
C. R. R. Boyd
Inventor.
Jeptha Dyson

UNITED STATES PATENT OFFICE.

JEPTHA DYSON, OF FULTON, SOUTH CAROLINA.

IMPROVEMENT IN CARDING-ENGINES.

Specification forming part of Letters Patent No. 26,347, dated December 6, 1859.

*To all whom it may concern:*

Be it known that I, JEPTHA DYSON, of Fulton, in the county of Clarendon and State of South Carolina, have invented a new and useful Improvement in Carding-Engines; and I do hereby declare that the following is a full, clear, and exact description of the same, reference being had to the accompanying drawings, forming a part of this specification, in which—

Figure 1 is a longitudinal vertical section of the carding-engine, the belting on one side being shown in red. Fig. 2 is a side elevation of the same, and Fig. 3 is a plan view of one of the small rollers with its card-teeth arranged spirally.

Similar letters of reference in each of the several figures indicate corresponding parts.

My invention relates to certain improvements in feeding and forwarding the cotton from the lap to the main cylinder in carding-engines, which are hereinafter more fully described, and differs essentially from all others for the same purpose where "feed-rollers" and "lickers," properly so called, are employed by dispensing with the use of both and substituting in lieu thereof a small cylinder clothed with strong coarse card-teeth or equivalent devices adapted to the end in view as a regulator for the uniform delivery of the lap and as a worker to what I call the "feeder." This feeder is made to operate in connection with the small cylinder, while at the same time it operates as a carding-cylinder on two other workers of different diameters before the cotton is delivered by the intervention of the working and a clearing and delivering cylinder to the main cylinder, while the largest of the working-cylinders above named is made to card on the main cylinder, thus making four working or carding points instead of one at the feed-rollers according to the common method.

To enable others skilled in the art to make and use my invention, I will proceed to describe its construction and operation.

A, Fig. 1, represents a cylinder clothed with strong card-teeth in the usual mode, which I term the "feeder."

$a$ is a small cylinder, less than half the diameter of the feeder A, clothed with card-teeth arranged spirally or otherwise, after the manner illustrated in Fig. 3, and serves to receive and hold the lap as delivered from the roll while operated upon by the more rapid motion of the feeder. The small cylinder $a$ thus performs a double function in regulating the uniform delivery of the lap and as a worker to the large cylinder A.

$c$ is a small working-cylinder clothed with very narrow card-filleting after the usual manner.

$b$ is a small clearing-cylinder clothed with card-teeth and intended to remove the cotton from the surfaces of the cylinders $a$ and $c$ and deliver it to the feeder A.

B is a working or carding cylinder of much larger size, having a surface speed of nearly half of that of the main cylinder, and intended to card on the feeder and on the main cylinder.

C is a clearer clothed with teeth and made to revolve in an opposite direction to the cylinder B, as indicated by arrows with a surface speed full two-thirds that of the main cylinder, and serves to remove the cotton from the surface of the feeder A and worker B, and also deliver it to the main cylinder D.

$f$ is an end view of a small pressure-roller, the journals of which are pressed upon at each end by springs $s$ $s$, so that the roller may yield to a moderate pressure upward and accommodate itself to any inequality in the lap. A throat or guide may be employed in connection with the roller and adjusted by springs in the same manner and for the same purpose.

Any suitable power being applied to the carrying-roller $e$ and to the main cylinder D, the whole machine may be set in operation by means of suitable gearing, the cylinders revolving in the direction shown by the arrows, and the lap will be carried to the pressure-roller $f$, which revolves across the lap and presses it to a convenient thickness. By this device it is so reduced in thickness as to prevent the teeth of the first feed-roller or regulator $a$ from entering the lap too deeply, and by condensing the lap enables the former to hold the lap firmly and draw it forward with due regularity. The surface of the cylinder $a$ is made to revolve at the rate it is required to feed the lap with a very slow and positive motion by suitable gearing, and holds and regulates its passage to the first carding-point $g$, while the feeder A, by a comparatively rapid motion, cards off the lap regularly, breaks down the lumps of cotton at the carding-point and carries the carded material to the next carding-point $h$ on the small worker $c$. The clearer $b$ in the meanwhile, revolving with a speed greatly exceeding that of $c$, removes the carded material regularly from the surfaces of the cylinders $a$ and $c$ and returns it to the surface of the feeder A. The carded material is next carried by the feeder A to the carding-point $i$ on the large worker B, which latter by an increased velocity, as already described, carries half or more of the carded material to the carding-point $k$ on the main cylinder, where it is again carded. The remaining portion of the material is carried around the point $l$ on the clearing and delivering cylinder C, where it is taken off by the latter, as also from the feeder A at the point $m$, and delivered to the main cylinder at the point $n$ and passed up to the point $k$ and carded over, if so desired.

E is a stripper, arranged to work in concert with cylinders D and C. This stripper cards at $o$ and strips at $p$. It should be remarked that the stripper, as usual, has a greater speed than the cylinder D, and that it runs at a greater speed than cylinder C. The stripper of course is to be so geared as to have a momentary cessation of its motion take place at intervals, so that the main cylinder may have a chance to take off the cotton which may have accumulated on it. By this arrangement of stripper the cylinder C not only acts as a clearer to B and A and delivering-cylinder to the main cylinder D, but also as a receiver for the stripper E.

A triple semicircular concave $w\ x\ y$ surrounds the cylinders A C E, and is in close proximity to them. This concave, which may be made of metal or wood, is perforated, as shown at $z\ z$, to permit the escape of sand, motes, or other impurities, while the loose cotton is retained.

What I claim as my invention, and desire to secure by Letters Patent, is—

1. The combination and arrangement of the feed-regulating and working cylinder $a$, feeder A, worker $c$, and clearer $b$, substantially in the manner and for the purpose described.

2. The combination and arrangement of the feeder A, worker B, clearing and delivering cylinder C, and main cylinder D, substantially as and for the purpose described.

3. The combination and arrangement of the feed-regulating and working cylinder $a$, feeder A, worker $c$, clearer $b$, worker B, clearing and delivering cylinder C, and main cylinder D, substantially in the manner and for the purpose set forth.

4. The combination, with the features included in the third claim, of the stripper E, substantially in the manner and for the purposes set forth.

JEPTHA DYSON.

Witnesses:
JOHN I. BOYD,
C. R. R. BOYD.